US006873930B2

(12) United States Patent
Hirn

(10) Patent No.: US 6,873,930 B2
(45) Date of Patent: Mar. 29, 2005

(54) METHOD FOR DETECTING ROTATIONAL SPEED

(75) Inventor: Rainer Hirn, Regensburg (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/332,689

(22) PCT Filed: Apr. 30, 2002

(86) PCT No.: PCT/DE02/01573
§ 371 (c)(1),
(2), (4) Date: Jan. 31, 2003

(87) PCT Pub. No.: WO02/093178
PCT Pub. Date: Nov. 21, 2002

(65) Prior Publication Data
US 2004/0102913 A1 May 27, 2004

(30) Foreign Application Priority Data
May 11, 2001 (DE) .................................. 101 23 022

(51) Int. Cl.⁷ .............................. G01P 11/00; G01P 3/00; G01L 3/26
(52) U.S. Cl. ..................... 702/142; 702/145; 73/116
(58) Field of Search .............................. 702/142, 145, 702/147; 73/1.37, 116

(56) References Cited

U.S. PATENT DOCUMENTS

| 5,628,291 | A | 5/1997 | Wrobel et al. ............... 123/357 |
| 5,789,658 | A | 8/1998 | Henn et al. ................... 73/1.37 |

FOREIGN PATENT DOCUMENTS

| DE | 37 05 586 A1 | 9/1988 | ........... F02D/41/14 |
| DE | 195 44 720 C1 | 3/1997 | ........... G01M/15/00 |
| DE | 196 22 042 A1 | 12/1997 | ........... G01P/3/481 |
| EP | 0 429 819 A1 | 6/1991 | ........... F02D/41/14 |
| WO | WO 01/77692 | 10/2001 | |

Primary Examiner—John Barlow
Assistant Examiner—Meagan S Walling
(74) Attorney, Agent, or Firm—Cohen, Pontani, Lieberman & Pavane

(57) ABSTRACT

The invention relates to a method for detecting the rotational speed of an internal combustion engine (1). According to the invention, a sector wheel (4) connected to a crankshaft (3) is scanned and the duration of the scanning of a sector of a specific size is determined. Correction factors which are dependent on the working parameters are then extracted from the characteristics in order to correct the measured duration in relation to the rotational speed oscillations occurring periodically during the operation of the internal combustion engine (1).

8 Claims, 3 Drawing Sheets

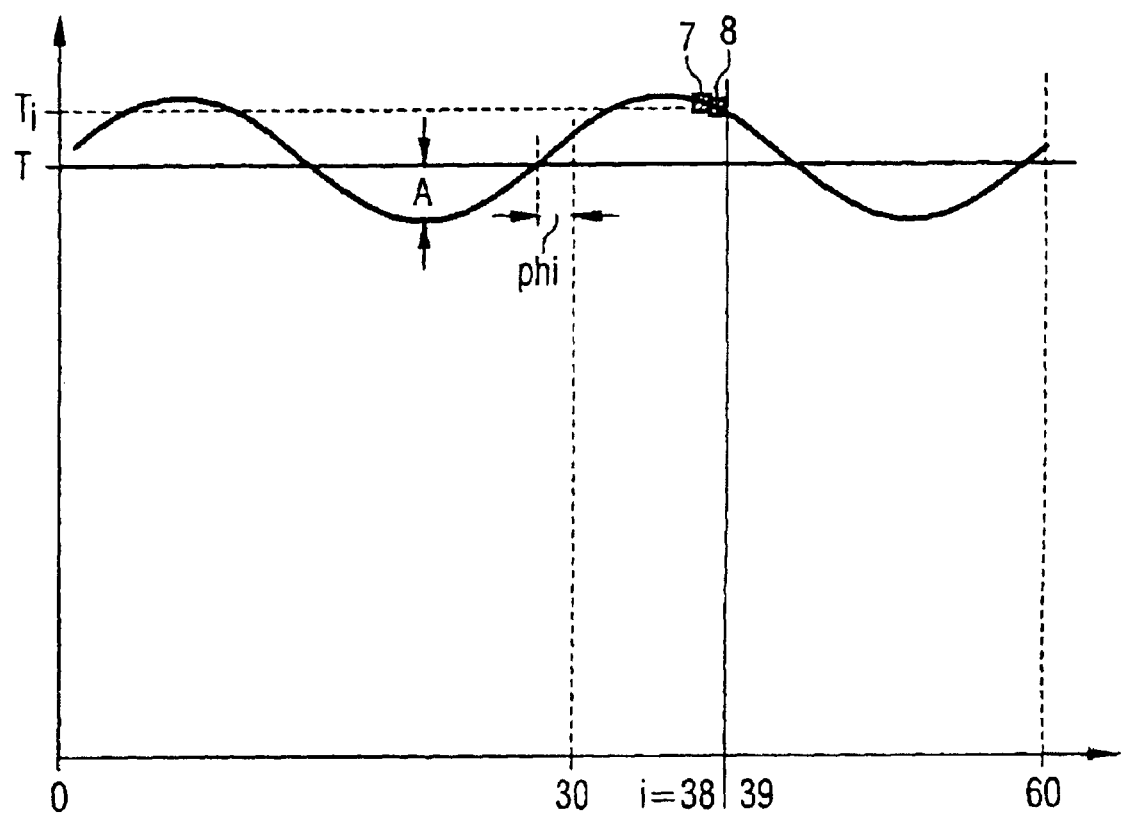

METHOD FOR DETECTING ROTATIONAL SPEED

PRIORITY CLAIM

This is a U.S. national stage of application No. PCT/DE02/01573, filed on 30 Apr. 2002. Priority is claimed on that application and on the following application(s): Country: Germany, Application No.: 101 23 022.2, Filed: 11 May 2001.

BACKGROUND OF THE INVENTION

1. Field of the Invention

The invention relates to a method of detecting the speed in an internal combustion engine, in which method a sector wheel connected to a crankshaft is scanned and the time taken for a sector of a certain size to pass is determined.

2. Description of the Prior Art

Such speed detection methods are conventional in internal combustion engines, in which case a gear with 60 teeth which is attached to a crankshaft is normally scanned. Since, as a result of the working principle of an internal combustion engine with constant change between compression and expansion of the working gas, the speed is not constant but has a periodic oscillation superimposed on it, this periodic oscillation originating from different torque contributions of the individual cylinders, averaging is normally carried out during the speed detection to the effect that several teeth of the gear are scanned. As a rule, the scanning is effected over an angle of rotation of the crankshaft of 180°, which corresponds to a working stroke of a four-cylinder four-stroke internal combustion engine. The scanning of shorter sectors or of a smaller number of teeth would entail too large an error on account of the abovementioned periodic oscillations.

In modern control units of an internal combustion engine, the averaging effected by the scanning of several teeth may be selected in virtually any desired manner with regard to the start of averaging or the end of averaging. Before certain control actions, for example the injection of fuel into cylinders of a diesel internal combustion engine, the averaging is started with respect to time in such a way that it is completed immediately before the planned action in order to than have speed information which is as current as possible. However, on account of the averaging over a working stroke, i.e. an angle of rotation of the crankshaft of 180°, the speed information is nonetheless not as current as would actually be desired, since averaging, from the communication point of view, constitutes a filter with low-pass function.

SUMMARY OF THE INVENTION

The object of the invention is therefore to specify a method of detecting the speed in an internal combustion engine, in which method the instantaneous speed of the internal combustion engine can be determined exactly without a time delay.

In a method described at the beginning of detecting the speed in an internal combustion engine, this object is achieved in that operating-parameter-dependent correction factors which are development coefficients for modeling periodic speed oscillations occurring during operation of the internal combustion engine are taken from a characteristic map, and, in order to achieve a corrective adjustment with regard to the periodic speed oscillations occurring during operation of the internal combustion engine, the time taken for a sector of a certain size of a sector wheel connected to the crankshaft to pass is corrected using these correction factors, so that a corrected time is obtained.

The concept according to the invention therefore takes into account information about the periodic speed oscillations which would lead to a distortion of the speed measurement if the time-consuming averaging is dispensed with. By the evaluation of these periodic speed oscillations in the form of operating-parameter-dependent correction factors stored in a characteristic map, the information concerning the oscillation can be evaluated. This enables the detection period to be reduced or even enables the averaging to be completely dispensed with.

As a result, not only is complete freedom in the selection of the instant of the speed detection provided—it is possible at any crank angle position—but a further defined objective for optimum speed detection is also achieved: a short measuring period can be realized. In particular, the measuring period can be markedly shorter than the previous averaging period of a working stroke.

Speed information which is much more current than was possible in the prior art is thus provided by the speed detection method according to the invention. This has an especially advantageous effect during operation of an internal combustion engine, since the control of the internal combustion engine can be based on more precise knowledge of the speed, a factor which makes possible improvements in ease of operation, operating reliability and fuel economy and also low emissions of an internal combustion engine.

The correction factors are to be selected in such a way that they provide information about the periodic speed oscillations which unavoidably occur during operation of the internal combustion engine. In this case, it is especially preferred that the correction factors are selected as development coefficients for a synthesis or modeling of the speed oscillations. Such correction factors then enable the speed oscillations to be modeled as a function of the operating point, so that these speed oscillations can then be taken into account very accurately and as a function of the operating parameters during the speed detection.

Of course, the correction factors may be based on any desired types of series development of an oscillation function. In the simplest version of a Fourier synthesis of the oscillation function of the oscillation, a simple sinusoidal oscillation, for example, is taken as a basis. The correction factors are then restricted to two values—amplitude and phase of the sinusoidal oscillation. In this case, too, they are stored in a characteristic map as a function of operating parameters. More complicated Fourier syntheses of the oscillation function then use correspondingly larger numbers of coefficients, a greater accuracy during the speed detection also being faced with this greater storage complexity. A Taylor development, for example, is also optionally possible.

How the correction factors are used for the corrective adjustment of the disturbance caused by the periodic speed oscillations is in principle not decisive for the invention. It is especially expedient, however, to calculate a time error from the correction factors, with which time error the time taken for the sector of certain size of the sector wheel to pass is corrected in order to correct errors caused by the periodic speed oscillation. This calculation method is especially simple to carry out and saves computing time, since only one time error has to be determined and then balanced with the measured time in a cumulative manner.

It is especially expedient in this case to calculate the current speed oscillation by modeling in order to calculate the time error from the correction factors. This can be done in the abovementioned manner by synthesis of the periodic speed oscillation. As mentioned, the synthesis of the oscillation by a Taylor or Fourier development is suitable for this purpose. In the simplest case, the modeling of the periodic oscillation by a sinusoidal oscillation is sufficient. As already mentioned, this modeling especially saves memory.

The accuracy with which the speed can be detected depends essentially on two parameters: firstly, on the exactness with which the oscillation can be modeled; secondly, on the accuracy with which the speed can be measured and therefore on the size of the sector over which the sector wheel is scanned. The concept according to the invention now enables the speed detection to be selected as a function of the requisite accuracy. If a highly accurate speed detection is required, firstly the computational complexity for simulating the periodic oscillation can be increased, and secondly a larger sector of the sector wheel can be scanned. In the case of a lower accuracy requirement, the computational complexity can be reduced and/or the scanned sector size can be reduced.

The method is especially advantageous for internal combustion engines of conventional type of construction, if a gear connected to the crankshaft in a rotationally locked manner is used as sector wheel.

The correction factors can be produced by theoretical model considerations with regard to the internal combustion engine provided for the application. However, it is especially preferred to obtain the correction factors, as a function of operating parameters of the internal combustion engine, from a measurement of the speed oscillations on a test bed.

BRIEF DESCRIPTION OF THE DRAWINGS

The invention is explained by way of example below with reference to the drawings, in which:

FIG. 5 is a time graph showing a time series for the pass times of various sectors of a sector wheel.

DETAILED DESCRIPTION OF THE PREFERRED EMBODIMENTS

Figure 1:
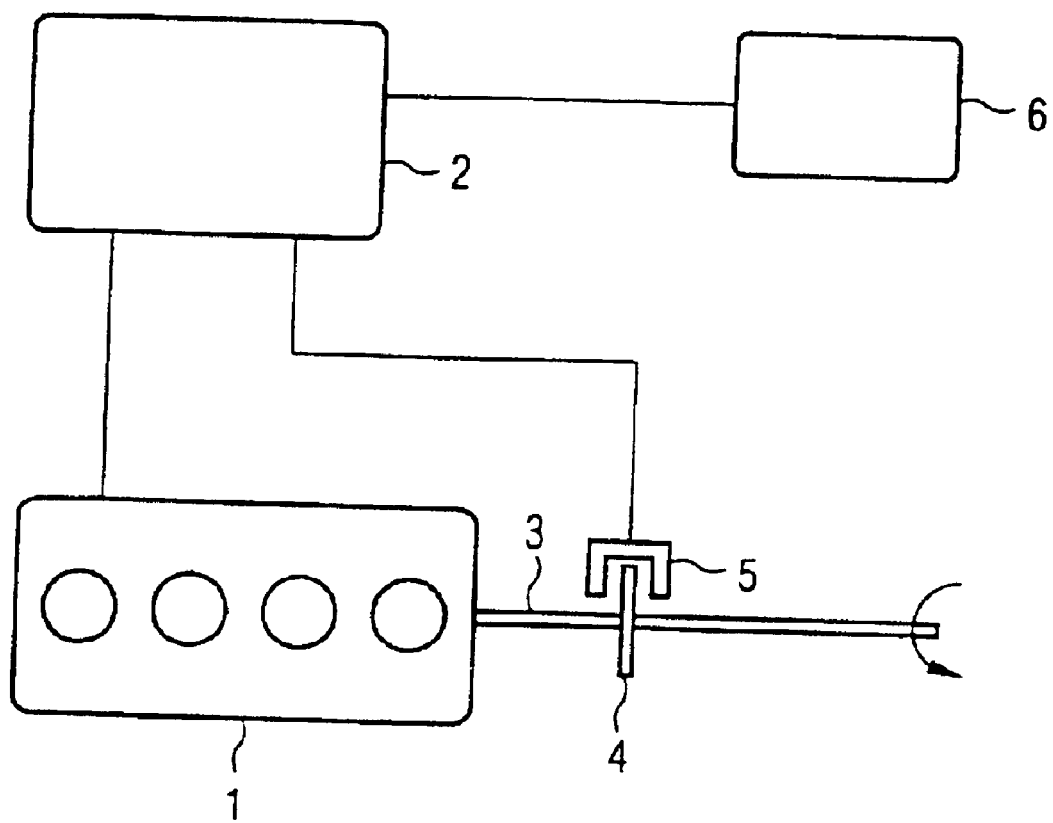
FIG. 1 is a block diagram of an internal combustion engine whose speed is to be detected.

Shown schematically in FIG. 1 is an internal combustion engine 1, the operation of which is controlled by a control unit 2 via lines not designated in any more detail. This control unit 2 measures operating parameters of the internal combustion engine, for example the speed N and the load and assigns a fuel quantity which is necessary for performing the current operating phase to the internal combustion engine 1, which is a four-cylinder internal combustion engine in the example shown schematically.

The internal combustion engine 1 sets a crankshaft 3 in rotation, which drives a motor vehicle (not shown). Sitting on the crankshaft 3 is a gear 4 which has 60 teeth. The teeth of the gear 4 are sensed by a fork-type light barrier 5, which directs its signals to the control unit 2 via lines (not designated).

From the signals of the fork-type light barrier 5, the control unit 2 determines information about the rotary speed N, this information being required for controlling the operation of the internal combustion engine 1. To this end, in a speed detection method yet to be described, the control unit 2 accesses a characteristic map memory 6 in which values are filed in a characteristic map as a function of operating parameters.

For the operation of the internal combustion engine 1, the control unit 2 needs to know the current speed N of the crankshaft 3. This information is required, for example, when determining the fuel quantity to be injected into the cylinders of the internal combustion engine 1, which in the present example is a diesel internal combustion engine, and when selecting the injection instant. The speed information should therefore be the most current information for optimum operation of the internal combustion engine at the instant at which the injection is carried out and should correspond to the actual speed N of the crankshaft 3. Periodic speed oscillations are superimposed on the rotation of the crankshaft 3, these speed oscillations originating from different torque contributions of the individual cylinders of the four-cylinder internal combustion engine 1.

FIG. 5 shows the effect of this periodic oscillation for the model case of a uniform average speed N. In FIG. 5, the time T which is required for each tooth of the gear 4 to pass the fork-type light barrier 5 is plotted against the tooth number i. As can be seen, the time $T_i$ for the individual teeth fluctuates periodically. In the example shown, this involves a sinusoidal oscillation which runs with an amplitude A about the average time T. Furthermore, this sinusoidal oscillation has a phase phi relative to the tooth used as calibration having the number 0 or of the tooth having the number 30. If the time $T_i$ for the tooth having the number i=38 or i=39 is now measured at the measuring point 7 or 8, an extended time is obtained as a result of the periodic oscillation, and this extended time would result in an incorrect speed N.

Figure 2:
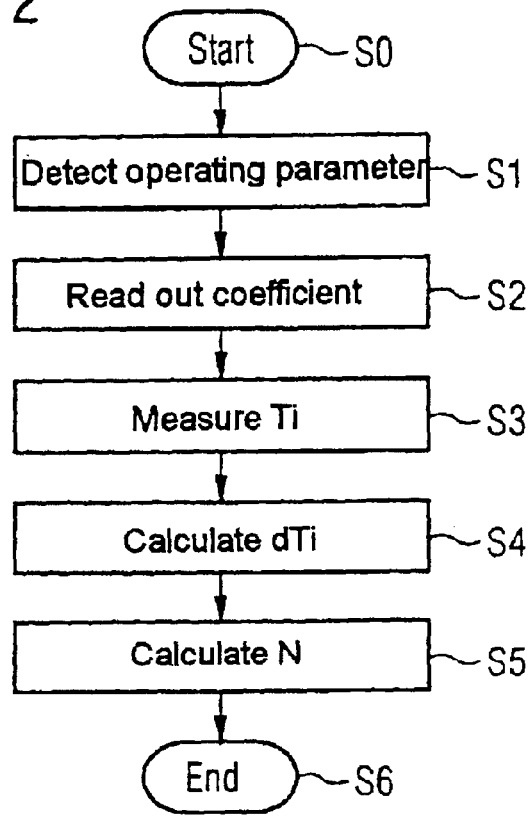
FIG. 2 is a flow chart of a speed detection method.

To correct this effect, the control unit 2 carries out the method shown in FIG. 2 for determining the speed.

The method is started with a step S0. Next, operating parameters of the internal combustion engine 1 are detected in a step S1 by the control unit 2. These are the operating parameters via which correction factors subsequently used during the correction are set up in a characteristic map filed in the characteristic map memory. Next, in a step S2, these correction factors are read into the control unit 2 from the characteristic map memory 6. Then, in a step S3, the time required by the tooth on the gear 4 to pass the fork-type light barrier 5 is measured. The time $T_i$ determined as a result constitutes the pass time of the ith tooth of the gear 4.

During a completely uniform rotation of the crankshaft 3, this time $T_i$ would be constant for all the teeth of the gear 4, so that the speed would not change. Even with an absolutely uniform average speed of the crankshaft 3 of the internal combustion engine 1, the aforementioned periodic oscillations occur, for which reason the times $T_i$ for the different tooth numbers i vary.

A time error $dT_i$ currently caused by the periodic oscillation is calculated in a step S4. This calculation may be effected in different ways.

In a first calculation variant, the periodic speed oscillation is simulated by a Fourier synthesis. This simulation requires the internal combustion engine to have been measured beforehand on a test bed, the periodic curve of the oscillation being recorded for as many operating parameters or operating points of the internal combustion engine as possible and being converted into corresponding synthesis coefficients. The latter are then filed in the characteristic map memory 6. In a simplest approximation to the periodic oscillation, the Fourier series of the oscillation synthesis can be truncated after the first coefficient. The time error $dT_i$ is then given by the following equation:

$$dT_i = A \cdot \sin 2\pi(i+\text{phi})/30 \quad (1)$$

where A represents the amplitude of the oscillation and phi represents the phase which are in each case set up in the characteristic map memory 6 via the selected operating parameters, for example load and average speed. Of course, other operating parameter dependencies may also be selected, for example oil temperature of the internal combustion engine, injected fuel quantity, etc.

Figure 3:
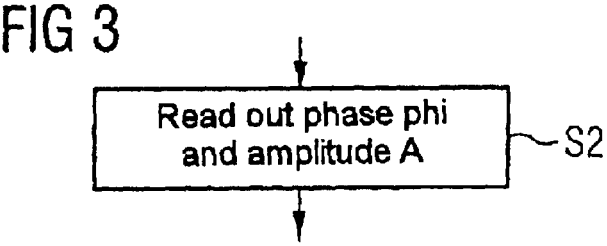
FIGS. 3 and 4 are partial flow charts which show modifications to the flow chart in FIG. 2.

This variant, in which the periodic oscillation of the speed is approximated by a sinusoidal oscillation, is shown in FIG. 3, which shows the alternative configuration of the step S3 in FIG. 2.

In a second calculation variant, the oscillation is not synthesized by a Fourier series but by a Taylor series. Here, too, the quality of the modeling can be controlled by the selection of the corresponding approximation elements and therefore of the corresponding number of development coefficients.

In a step S5, the time error $dT_i$ determined in this way is subtracted from the measured time $T_i$ and is used according to the following equation for calculating the speed N:

$$N = 1/(T_i - dT_i) \quad (2)$$

Figure 4:
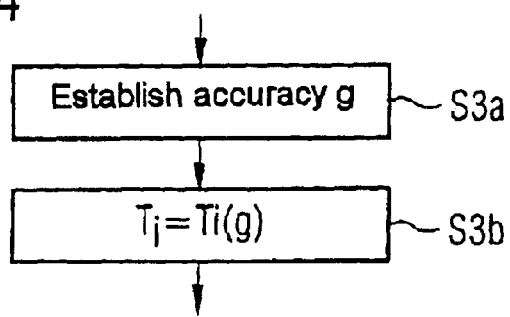

Optionally, it is possible to influence the accuracy of the speed detection not only by the computational complexity used in the modeling of the periodic oscillation but also by averaging over several measuring points 7, 8 or several tooth numbers i during the measurement of the time $T_i$. These facts are shown in the manner of a block diagram in FIG. 4, in which steps S3a and S3b are shown, which replace the step S3 in FIG. 2. In this case, first an accuracy with which the speed is to be detected is established. Then the size of the sector of the sector wheel, that is to say the number of teeth of the gear which are to be scanned, is established in step S3b, as a result of which the length of the averaging is determined. Of course, equation (1), which is based on the measurement of the pass time $T_i$ of an individual tooth, has to be modified accordingly for this case.

What is claimed is:

1. A method for detecting a rotational speed of an internal combustion engine which exhibits periodic speed oscillations, a crankshaft having a sector wheel being connected to the internal combustion engine, the method comprising the steps of:
    scanning the sector wheel connected to the crankshaft at a scanning location;
    determining a time taken for a sector having a sector size to pass the scanning location;
    retrieving operating-parameter-dependent correction factors from a characteristic map, the operating-parameter-dependent correction factors being development coefficients for modeling the periodic speed oscillations which occur during operation of the internal combustion engine, wherein the operating-parameter-dependent correction factors are development coefficients of one of a Taylor series and a Fourier series; and
    correcting the determined time by determining a corrective adjustment for the periodic speed oscillations using the operating-parameter-specific correction factors and obtaining a corrected time using the determined time and the corrective adjustment.

2. The method of claim 1, wherein the step of correcting the determined time further comprises calculating from the operating-parameter-dependent correction factors a time error by which the time is changed by the periodic oscillation.

3. The method of claim 2, further comprising the step of modeling the actual periodic speed oscillations exhibited by the internal combustion engine to calculate the time error from the operating-parameter-dependent correction factors.

4. A method for detecting a rotational speed of an internal combustion engine which exhibits periodic speed oscillations, a crankshaft having a sector wheel being connected to the internal combustion engine, the method comprising the steps of:
    scanning the sector wheel connected to the crankshaft at a scanning location;
    determining a time taken for a sector having a sector size to pass the scanning location;
    retrieving operating-parameter-dependent correction factors from a characteristic map, the operating-parameter-dependent correction factors being development coefficients for modeling the periodic speed oscillations which occur during operation of the internal combustion engine; and
    correcting the determined time by determining a corrective adjustment for the periodic speed oscillations using the operating-parameter-specific correction factors, obtaining a corrected time using the determined time and the corrective adjustment, and calculating from the operating-parameter-dependent correction factors a time error by which the time is changed by the periodic oscillation.

5. The method of claim 4, further comprising the step of modeling the actual periodic speed oscillations exhibited by the internal combustion engine to calculate the time error from the operating-parameter-dependent correction factors.

6. A method for detecting a rotational speed of an internal combustion engine which exhibits periodic speed oscillations, a crankshaft having a sector wheel being connected to the internal combustion engine, the method comprising the steps of:
    scanning the sector wheel connected to the crankshaft at a scanning location;
    determining a time taken for a sector having a sector size to pass the scanning location;
    retrieving operating-parameter-dependent correction factors from a characteristic map, the operating-parameter-dependent correction factors being development coefficients for modeling the periodic speed oscillations which occur during operation of the internal combustion engine; and
    correcting the determined time by determining a corrective adjustment for the periodic speed oscillations using the operating-parameter-specific correction factors and obtaining a corrected time using the determined time and the corrective adjustment,
    wherein the step of determining a time further comprises selecting the size of the sector as a function of the desired accuracy of the speed detection, wherein a larger sector size exhibits a higher accuracy than a smaller sector size.

7. The method of claim 6, wherein the sector wheel comprises e gear connected to crankshaft such that the gear is fixed with respect to rotation relative to the crankshaft.

8. A method for detecting a rotational speed of an internal combustion engine which exhibits periodic speed oscillations, a crankshaft having a sector wheel being connected to the internal combustion engine, the method comprising the steps of;

scanning the sector wheel connected to the crankshaft at a scanning location;

determining a time taken fur a sector having a sector size to pass the scanning location;

retrieving operating-parameter-dependent correction factors from a characteristic map, the operating-parameter-dependent correction factors being development coefficients for modeling the periodic speed oscillations which occur during operation of the internal combustion engine;

correcting the determined time by determining a corrective adjustment for the periodic speed oscillations using the operating-parameter-specific correction factors and obtaining a corrected time using the determined time and the corrective adjustment; and measuring the speed oscillations of the internal combustion engine on a test bed for developing the operating-parameter-dependent correction factors.

* * * * *